(12) United States Patent
Jessop

(10) Patent No.: US 11,638,992 B2
(45) Date of Patent: May 2, 2023

(54) TOOL RETAINING SYSTEMS, METHODS AND APPARATUS

(71) Applicant: ARMOR BUILDERS, INC, Victor, MT (US)

(72) Inventor: David P. Jessop, Victor, MT (US)

(73) Assignee: Armor Builders, Inc., Victor, MT (US)

( * ) Notice: Subject to any disclaimer, the term of this patent is extended or adjusted under 35 U.S.C. 154(b) by 21 days.

(21) Appl. No.: 17/118,315

(22) Filed: Dec. 10, 2020

(65) Prior Publication Data

US 2021/0205979 A1 Jul. 8, 2021

Related U.S. Application Data

(60) Provisional application No. 63/026,238, filed on May 18, 2020, provisional application No. 62/946,273, filed on Dec. 10, 2019.

(51) Int. Cl.
*B25H 3/04* (2006.01)
*A45F 5/02* (2006.01)
*F16B 2/22* (2006.01)

(52) U.S. Cl.
CPC .............. *B25H 3/04* (2013.01); *A45F 5/021* (2013.01); *F16B 2/22* (2013.01); *A45F 2200/0575* (2013.01)

(58) Field of Classification Search
CPC .... B25H 3/04; A45F 5/021; A45F 2200/0575; F16B 2/22
See application file for complete search history.

(56) References Cited

U.S. PATENT DOCUMENTS

| | | | | |
|---|---|---|---|---|
| 1,017,102 | A * | 2/1912 | Kaufman | A62C 13/78 |
| | | | | 294/166 |
| 5,026,016 | A * | 6/1991 | Lisowski | F16B 21/09 |
| | | | | 248/314 |
| 5,035,389 | A * | 7/1991 | Wang | F16M 11/041 |
| | | | | 248/225.11 |
| 5,356,038 | A * | 10/1994 | Banks | B65D 35/40 |
| | | | | 222/105 |

(Continued)

FOREIGN PATENT DOCUMENTS

DE 102016105944 A1 * 10/2017 ............... B25H 3/04
DE 202019101473 U1 * 6/2019

(Continued)

*Primary Examiner* — Stanton L Krycinski
(74) *Attorney, Agent, or Firm* — Bretton L. Crockett; TechLaw Ventures, PLLC

(57) ABSTRACT

Systems, methods, and apparatus for securing tools for use, storage, and transport. One illustrative system may include a tool securing assembly with a tool retaining clip that can be detachably mounted to a base assembly. The tool retaining clip may be formed from a resilient material and have a tool insertion opening smaller than a diameter of a portion of a tool to be secured therein that leads to a larger tool retaining space. When a tool is inserted, the tool insertion opening flexes to provide positive physical feedback that the tool is secured. The retaining clip may require the tool to be rotated as it is inserted to provide additional physical feedback. The base assembly may have a front mounting portion and rear securing portion separated by a retaining recess. The tool retaining clip may also be secured on a storage rack for storage or transport.

16 Claims, 8 Drawing Sheets

(56) References Cited

U.S. PATENT DOCUMENTS

| | | | | |
|---|---|---|---|---|
| 5,375,749 | A * | 12/1994 | Oliva | A45F 5/02 24/3.9 |
| 5,850,996 | A * | 12/1998 | Liang | A45F 5/02 248/221.11 |
| 6,637,707 | B1 * | 10/2003 | Gates | A47F 5/08 248/222.12 |
| 7,090,085 | B1 * | 8/2006 | Vicendese | B42F 7/00 403/381 |
| 7,950,534 | B2 * | 5/2011 | Kao | A47F 5/0846 211/94.01 |
| 8,302,786 | B2 * | 11/2012 | Kao | A47F 5/0846 211/70.6 |
| 9,205,552 | B2 * | 12/2015 | Kao | F16M 13/022 |
| 9,205,553 | B2 * | 12/2015 | Ou | B25H 3/04 |
| 9,597,792 | B1 * | 3/2017 | Kao | B25H 3/04 |
| 9,618,829 | B2 * | 4/2017 | Silva | F16B 2/22 |
| 9,656,385 | B1 * | 5/2017 | Kao | A47F 7/0035 |
| 9,694,491 | B1 * | 7/2017 | Kao | B25H 3/003 |
| 9,827,663 | B2 * | 11/2017 | Kao | B25H 3/04 |
| 9,925,657 | B1 * | 3/2018 | Kao | B25H 3/04 |
| 10,039,423 | B2 * | 8/2018 | Schultz | F16B 5/0657 |
| 10,104,986 | B2 * | 10/2018 | Schaefer | A47B 73/008 |
| 10,165,851 | B1 * | 1/2019 | Downs | A45F 5/021 |
| 10,625,411 | B2 * | 4/2020 | Tesoroni | F16B 2/22 |
| 11,412,630 | B2 * | 8/2022 | Mayfield | A45C 13/005 |
| 2004/0099624 | A1 * | 5/2004 | Hein | A47L 13/512 211/89.01 |
| 2009/0134288 | A1 * | 5/2009 | Kao | B25H 3/04 248/214 |
| 2016/0016306 | A1 * | 1/2016 | Haddon | B25H 3/04 248/537 |
| 2016/0131167 | A1 * | 5/2016 | Taniguchi | G01C 19/00 473/516 |
| 2016/0223171 | A1 * | 8/2016 | Gibbons | H01R 13/03 |
| 2022/0248835 | A1 * | 8/2022 | Yeates | A45F 5/021 |

FOREIGN PATENT DOCUMENTS

| | | | | |
|---|---|---|---|---|
| EP | 2792455 B1 * | 7/2020 | | B25H 3/04 |
| GB | 2527299 A * | 12/2015 | | A47F 7/0021 |
| GB | 2548360 A * | 9/2017 | | B25H 3/04 |
| GB | 2548837 A * | 10/2017 | | B25H 3/04 |
| WO | WO-2019228664 A1 * | 12/2019 | | B25H 3/04 |

* cited by examiner

TOOL RETAINING SYSTEMS, METHODS AND APPARATUS

CROSS-REFERENCE TO RELATED APPLICATION

This application claims the benefit of U.S. Provisional Application No. 62/946,273, filed Dec. 10, 2019, which is incorporated herein by reference in its entirety, including but not limited to those portions that specifically appear hereinafter, and claims the benefit of U.S. Provisional Application No. 63/026,238, filed May 18, 2020, 2019, which is incorporated herein by reference in its entirety, including but not limited to those portions that specifically appear hereinafter.

BACKGROUND

Numerous clips and holders for retaining hand tools on a belt for use by a workman are known. However, most are designed for use with a single specific tool and are only usable when attached to a belt. Many are awkward to use and require a user to visually ensure the tool is secure.

A tool retaining system that securely retains tools in a fixture that can be interchangeably mounted to a belt or to a storage or transport structure would be an improvement in the art. Such a system that provided positive feedback to a user when a tool was securely stowed would be a further improvement in the art.

SUMMARY

The present disclosure includes systems for securing tools for use, storage, and transport. In one illustrative embodiment, a system includes a tool securing assembly that features a tool retaining clip. The tool retaining clip may be formed from a resilient material and have a tool insertion opening smaller than a diameter of a handle or stem of a tool to be secured therein that leads to a larger tool retaining space. When a tool is inserted, the tool insertion opening flexes to provide positive physical feedback that the tool is secured in the retaining clip. Where the tool has a stem portion with a non-round cross-sectional shape, the retaining clip may require the tool to be rotated as it is inserted to provide additional physical feedback.

The tool retaining clip may be detachably mounted to a wearable base assembly, which may have a front mounting portion and rear securing portion separated by a retaining recess. The wearable base assembly may be secured on an item attached to the body, such as tool belt, to securely stow the tool when needed by a user at a job site. For transport or storage, the tool retaining clip may be detachably secured on a specialized storage rack or beam to retain the tool thereon in a secured position. in some embodiments, the tool retaining clip may be secured to a storage base assembly that is attached to the storage rack or beam.

In some embodiments, the tool retaining clip may be rotatably mounted to the base assembly to allow the tool to utilized while secured, as for use with a fishing rod or the like.

The features and advantages of the disclosure will be set forth in the description, which follows, and in part will be apparent from the description, or may be learned by the practice of the disclosure without undue experimentation. The features and advantages of the disclosure may be realized and obtained by means of the instruments and combinations particularly pointed out in the appended claims. Any discussion of documents, acts, materials, devices, articles or the like, which has been included in the specification is not to be taken as an admission that any or all these matters form part of the prior art base, or were common general knowledge in the field relevant to the disclosure as it existed before the priority date of each claim of this disclosure.

DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

The disclosure extends to methods, systems, and devices for securing tools for use, storage, and transport. In the following description of the disclosure, reference is made to the accompanying drawings, which form a part hereof, and in which is shown by way of illustration specific implementations in which the disclosure may be practiced. It is understood that other implementations may be utilized, and structural changes may be made without departing from the scope of the disclosure.

Before the methods, systems and devices of the present disclosure are discussed and described, it is to be understood that this disclosure is not limited to the particular configurations, process steps, and materials disclosed herein as such configurations, process steps, and materials may vary somewhat. It is also to be understood that the terminology employed herein is used for the purpose of describing implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

Figure 1A:
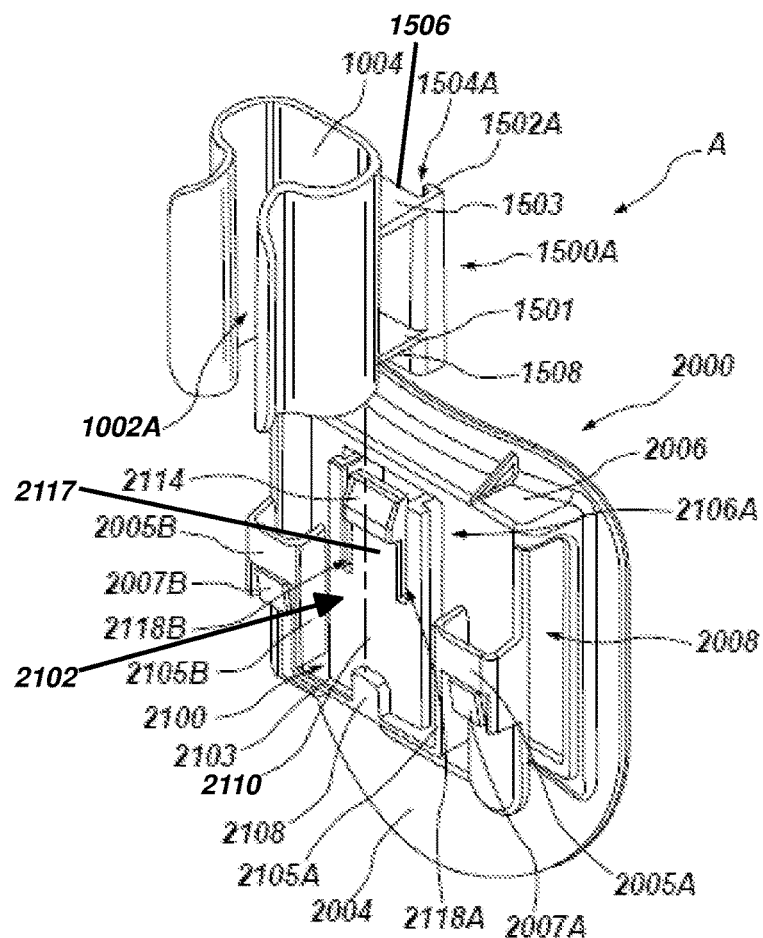
FIGS. 1A and 1B are perspective views, respectively, of a first illustrative embodiment of a tool securing assembly for a tool retaining system in accordance with the present disclosure with a base assembly for the tool securing assembly in an unassembled position and an assembled position.
Figure 1B:
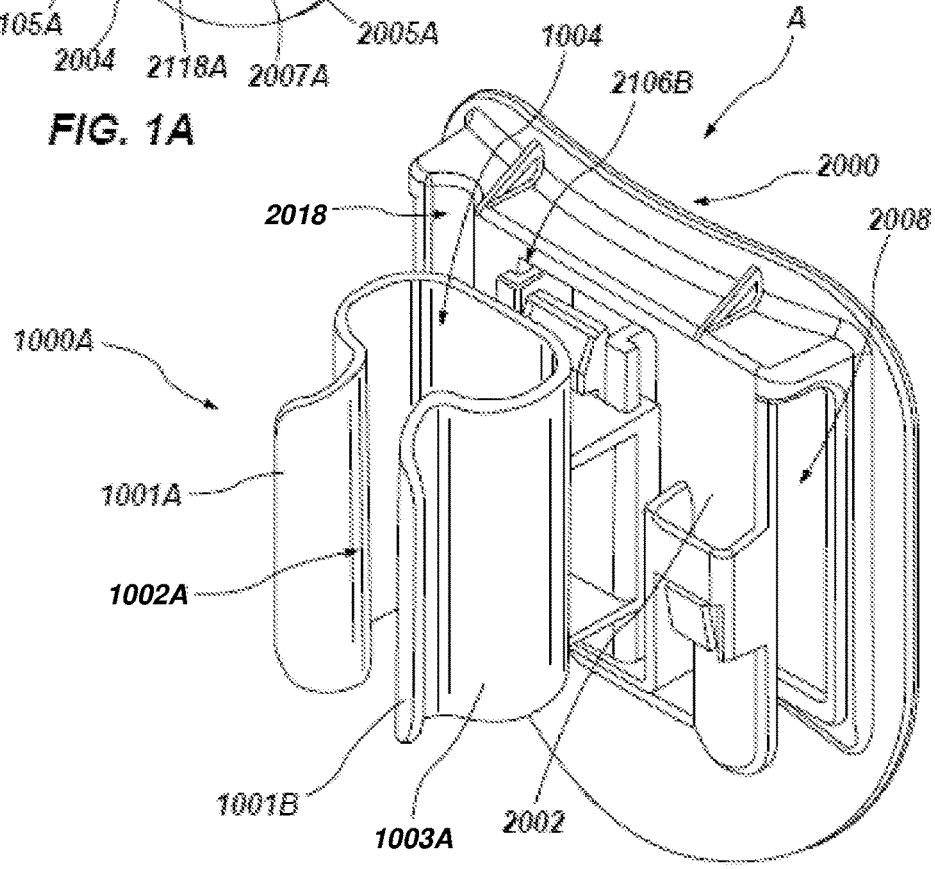

Referring to FIGS. 1A and 1B, a first illustrative embodiment of a tool securing assembly A for use in a system in accordance with the teachings of the present disclosure are depicted. Tool securing assembly A features a tool retaining clip 1000A.

Tool retaining clip 1000A may have a tool insertion opening, generally indicated at 1002A, which has a width in the unflexed position that is smaller than a diameter of the portion of a tool, such as a handle or stem, to be secured therein. The tool insertion opening 1002A may be formed as a vertical slot that is defined by two opposite side members, 1001A and 1001B, and allows access therethrough to a tool retaining space 1004A. Tool retaining space 1004A is defined by a sidewall 1003A that partially surrounds the space. In the depicted embodiments, the sidewall 1003A may define a generally columnar bore.

Tool retaining clip 1000A may be formed from a resilient material that allows the opposite side members 1001A and 1001B to flex away from one another to enlarge the insertion opening 1002A as a tool is pressed against the side members 1001A and 1001B for insertion or removal. Any suitable material may be used, including thermoplastic acrylic-polyvinyl chloride materials, such as KYDEX with is commercially available in sheets from Sekisui SPI, or suitable injection molded materials. In the depicted embodiment, tool retaining clip 1000A is directly molded with an attachment portion 1500 extending from the rear surface thereof, as will be discussed further herein.

When a tool is inserted, the tool insertion opening 1002A flexes to provide positive physical feedback that the tool is secured in the retaining clip. Where the tool has a stem portion with a non-round cross-sectional shape, the retaining clip may require the tool to be rotated as it is inserted to provide additional physical feedback. In the depicted embodiments, tool clip 1000A is configured retain the handle of a hammer therein.

Tool retaining clip 1000A includes a connection portion 1500A, which may be used to connect the clip 1000A to a user mountable base assembly 2000 for use or to a storage base 3000. As depicted, in one illustrative embodiment, the connection portion 1500A may be formed as a slidably mountable connector that interacts with corresponding connection structures on a base assembly, as discussed further herein. As depicted, a generally planar sidewall 1506 which extends parallel to the tool retaining clip 1000A long axis, may be spaced from a rear of the clip sidewall 1003A by an upper member 1503 extending from its top edge and a lower member 1501. A lower front surface 1508 may be accessible below the lower member 1501. Along either side edge of the sidewall 1506, a generally L shaped member 1502A or 1502B (not shown) may form an elongated "hook" as it extends generally inwards to define a slot 1504A or 1504B (not shown) against the sidewall 1506.

A usage base assembly 2000, provides for attachment to a clip assembly 1000A, allowing the clip and for the tool securing assembly 10 to be secured in place for use. As depicted, a front mounting portion 2004 may be generally formed as a planar member. Similarly, a rear securing portion 2002 may generally be formed as a planar member. Rear securing portion 2002 and front mounting portion 2004 may be joined together at a top end by a top member 2006, under which they extend parallel to one another separated by a space defining a retaining recess 2008. A connection portion 2100 may be disposed in the front mounting portion 2004. In the depicted embodiment, the connection portion 2100 may include a seat 2102 including a central portion 2110 that corresponds to the generally planar sidewall 1506 of the clip and a sidewall member 2102 that forms a stop or floor 2103 at a lower end of the seat and a two opposite sidewalls 2105A and 2105B which extend upwards from the floor 2103 parallel to and spaced apart from the central portion 2104 to allow the connection portion 1500A or 1500B to be inserted therein. Along either long side of the central portion 2104, a receiving slot 2106A or 2106B may be formed as an undercut for interaction with a generally L shaped member 1502A or 1502B as the connection portion 1500A is inserted.

The central portion may further include a securing member 2114 which may be formed as a slanted member with a lower ledge disposed at an upper end of a relatively flexible portion 2117 of the central portion which is defined by parallel slots 2118A and 2118B. A front securing tab 2108 may be disposed as an extension from the stop 2103 which rises therefrom parallel to the central portion 2104 to define an insertion space.

On either side of the connection portion 2100, the front portion 2004 may include a loop member 2005A or 2005B formed thereon for use as a holder for a pencil or other marking instrument. A relatively flexible keeper member 2007A or 2007B may extend downwards from the loop member and towards to central portion 2004 sidewall to secure a marking instrument thereon. As depicted, the sidewall of the front portion 2004 may include a marker groove 2018 formed as an elongated groove that passes behind the loop member 2005B and is sized and configured to allow a larger diameter marking member, such as a SHARPIE brand marker to be secured therein.

As depicted in FIG. 1B, the tool retaining clip 1000A may be secured to the usage base assembly 2000. Connection portion 1500A is slidably inserted into the seat 2100, with the sidewall 1506 adjacent central portion 2104. A lower end of the sidewall rests on floor 2102, with securing tab 2108 residing in front of lower portion front wall 1508 of the sidewall 1506 and the counterpart sidewalls 2105A and 2105B placed on either die of the connection portion 1500. The flexible securing member 2114 may be flexed rearwards as the clip is inserted with counterpart slots and L shaped members residing in one another along the edges, and then secure the top member 1503 under its ledge as it flexes forwards. For removal, a user may depress the flexible securing member 2114 and slide the clip 1000A upwards and out of the seat.

Usage base assembly 2000 may be secured on an item attached to the body, such as tool belt, to securely stow a tool retained in the tool clip 1500A for use when needed, but placed out of the way in an accessible position when not needed, for a user at a job site. For example, a base assembly 2000, with or without a tool retaining clip 1000A secured thereto, may be secured to a tool belt. The body of the tool belt may pass through the retaining recess 2008, such that as the belt is worn by a user, the top member 2006 abuts the upper edge of the tool belt. The belt may be inserted through the member from one side to the other and then secured to a user's body. Alternatively, and especially where a belt is already worn by a user, the front mounting portion 2004 and rear securing portion 2006 may be flexed away from one another to allow access to the retaining recess 2006 for insertion between the belt and the body of the user and the base lowered until the belt is secured in the retaining recess.

Figure 2A:
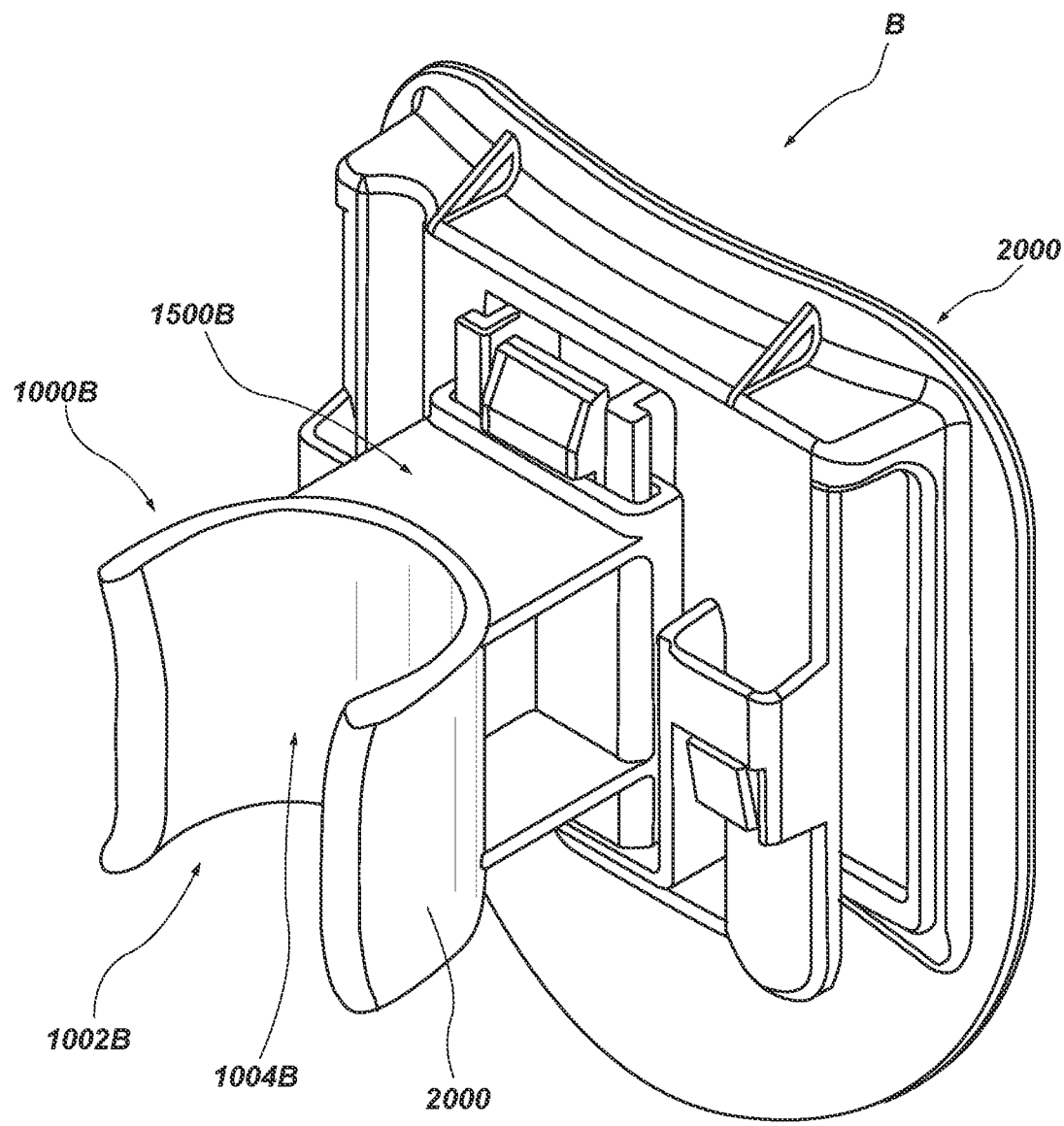
FIGS. 2A and 2B are perspective front views of second and third illustrative embodiments of tool securing assemblies for a tool retaining system in accordance with the present disclosure with the base assembly of FIGS. 1A and 1B assembly in an assembled and an unassembled position, respectively.

Turning to FIG. 2A, a second illustrative embodiment of a tool securing assembly B for use in a system in accordance with the teachings of the present disclosure is depicted. Tool securing assembly B features a tool retaining clip 1000B. While tool retaining clip 1000A is configured retain the handle of a hammer therein, tool retaining clip 1000B is configured to retain the handle portion of a cordless drill.

Tool retaining clip 1000B may have a tool insertion opening, generally indicated at 1002B, which has a width in the unflexed position that is smaller than a diameter of the portion of a tool, such as a handle or stem, to be secured therein. The tool insertion opening 1002B may be formed as a vertical slot that is defined by two opposite side members and allows access therethrough to a tool retaining space 1004B. Tool retaining space 1004B is defined by a sidewall 1003B that partially surrounds the space. In the depicted embodiments, the sidewall 1003B may define a generally columnar bore.

Tool retaining clip 1000B may be formed from a resilient material that allows the opposite side members to flex away from one another to enlarge the insertion opening 1002B as a tool is pressed against the side members for insertion or removal. In the depicted embodiment, tool retaining clip 1000B is directly molded with an attachment portion 1500 extending from the rear surface thereof, as will be discussed further herein. Attachment portion 1500B includes the same components as the tool retaining portion 1500A of tool retaining clip 1000A discussed previously herein and interacts with a usage base assembly in the same manner.

When a tool is inserted, the tool insertion opening 1002B flexes to provide positive physical feedback that the tool is secured in the retaining clip. Where the tool has a stem portion with a non-round cross-sectional shape, the retaining clip may require the tool to be rotated as it is inserted to provide additional physical feedback. Tool retaining clip 1000A includes a connection portion 1500A, which may be used to connect the clip 1000A to a user mountable base assembly 2000 for use or to a storage base 3000. As depicted, in one illustrative embodiment, the connection portion 1500A may be formed as a slidably mountable connector that interacts with corresponding connection structures on a base assembly, as discussed further herein. As depicted, a generally planar sidewall 1506 which extends parallel to the tool retaining clip 1000A long axis, may be spaced from a rear of the clip sidewall 1003A by an upper member 1503 extending from its top edge and a lower member 1501. A lower front surface 1508 may be accessible below the lower member 1501. Along either side edge of the sidewall 1506, a generally L shaped member 1502A or 1502B may form an elongated "hook" as it extends generally inwards to define a slot 1504A or 1504B against the sidewall 1506.

Figure 2B:
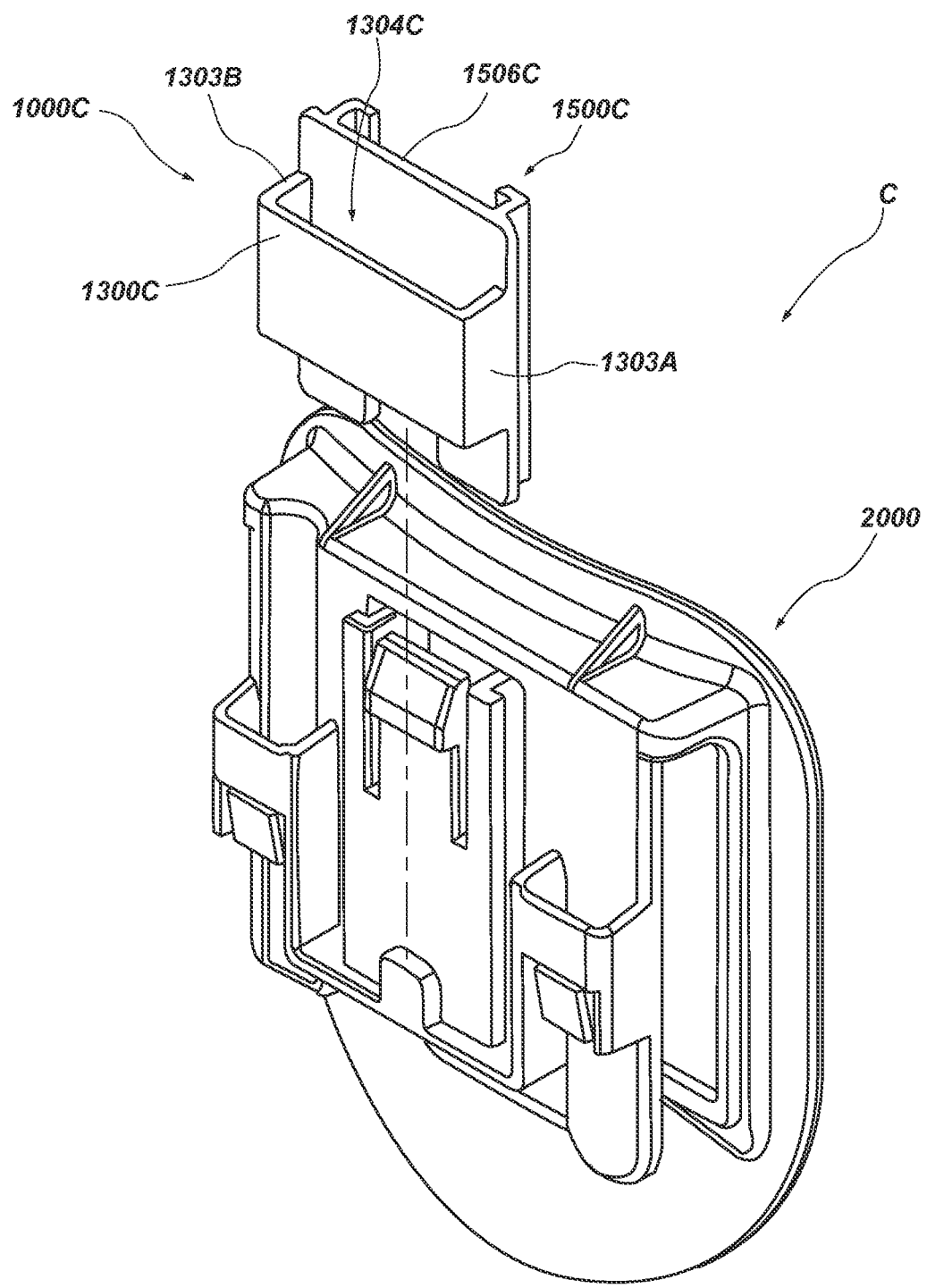

Turning to FIG. 2B, a second illustrative embodiment of a tool securing assembly C for use in a system in accordance with the teachings of the present disclosure is depicted. Tool securing assembly C features a tool retaining clip 1000C. Tool retaining clip 1000C is configured as a loop for connection to a retain a tape measure by insertion of the retaining clip of the tape measure therethrough. A generally planar member or sidewall 1506C defines the base of the clip 1000C body. On a front surface of the sidewall, a loop member 1300C is disposed. As depicted the loop member may be formed as a parallel member spaced at a distance from the planar member 1506C and attached thereto on either end by sidewalls 1303A and 1303B. A space 1304C is defined therebetween for insertion of a retaining clip on a measuring tape or other tool, such as chalk line or the like.

The planar member 1506C may serve as the sidewall of the connection portion 1500C, which may be used to connect the clip 1000C to a user mountable base assembly 2000 for use or to a storage base 3000, as discussed previously herein.

Figure 3A:
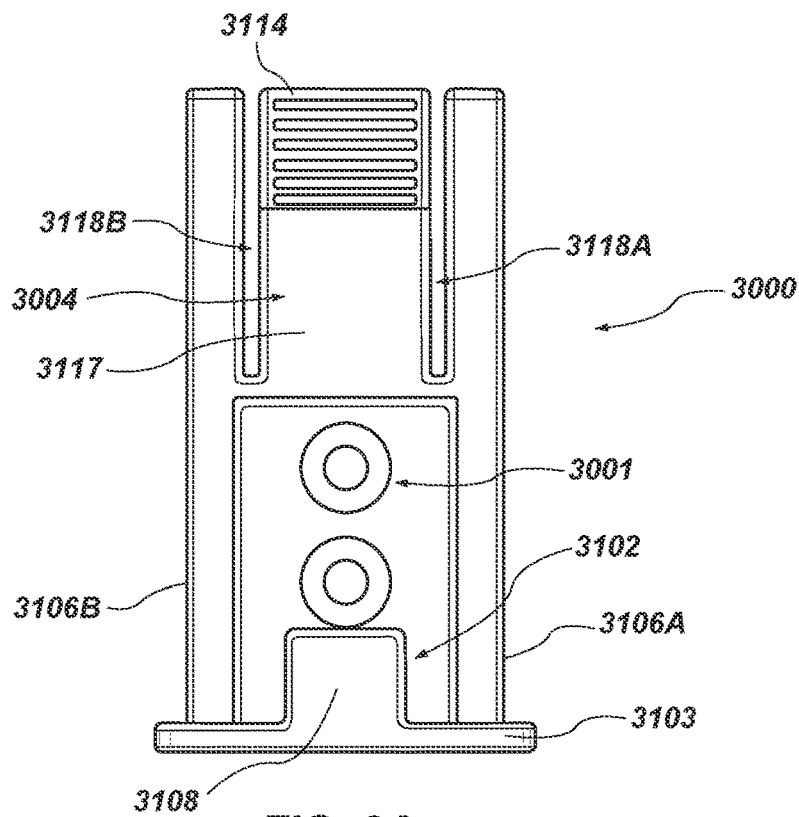
FIGS. 3A and 3B are front and rear perspective views of a storage base assembly for use with the tool securing assemblies of FIGS. 1A through 2B.
Figure 3B:
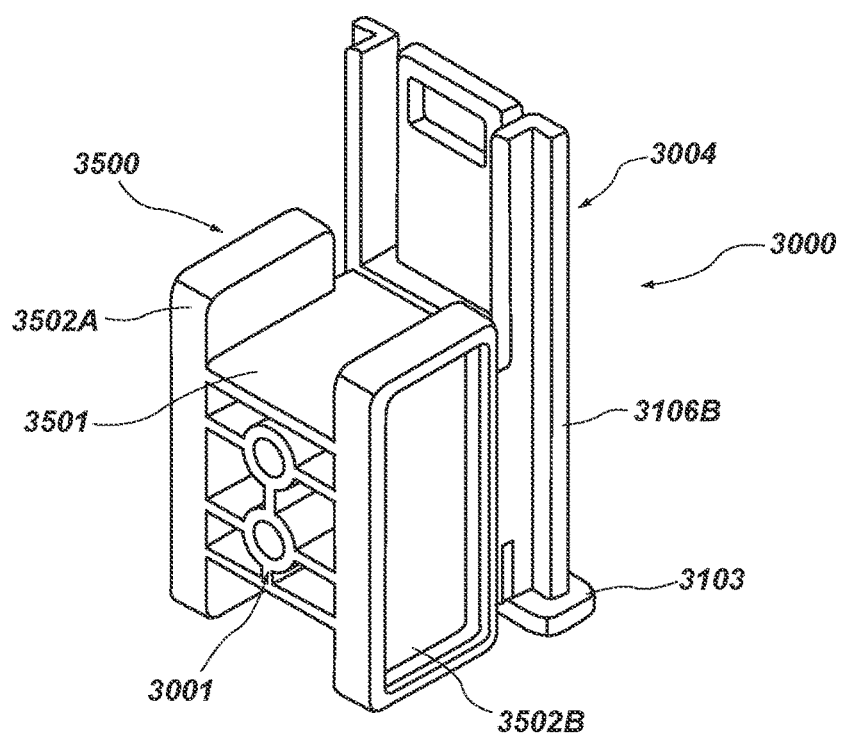

Turning to FIGS. 3A and 3B, on illustrative embodiment of a storage base assembly 3000 is depicted, which provides for attachment to a tool retaining clip similar to those depicted at 1000A, 1000B or 1000C, allowing the clip and the tool securing assembly 10 to be secured in place for storage. As depicted, a front mounting portion 3004 may be generally formed as a planar member attached to a rear beam connection body 3500. As depicted, one or more screw holes 3001 may pass through the front mounting portion and beam connection body.

Front mounting portion 3004 may define a connection portion, which includes a seat 3102 that defines a stop or floor 3103 extending forwards from the planar member at a lower end thereof. Along either long side of the planar member, a generally L-shaped edge extending downwards to the seat may define a receiver 3106A or 3106B for interaction with a generally L shaped member 1502A or 1502B as the connection portion 1500A is inserted thereover.

The central portion may further include a securing member 3114 which may be formed as a slanted member with a lower ledge disposed at an upper end of a relatively flexible portion 3117 of the central portion which is defined by parallel slots 3118A and 3118B. A front securing tab 3108 may be disposed as an extension from the stop 3103 which rises therefrom parallel to the central portion to define an insertion space.

Rear beam connection body 3500 may be formed as a central body 3501 with two side flanges 3502A and 3502B, disposed on either side thereof and configured for securing placement in for placement in a channel with a corresponding shape. It will be appreciated that in some embodiments, the entire connection body may be sized and configured for such placement and omit the flanges.

Figure 4A:
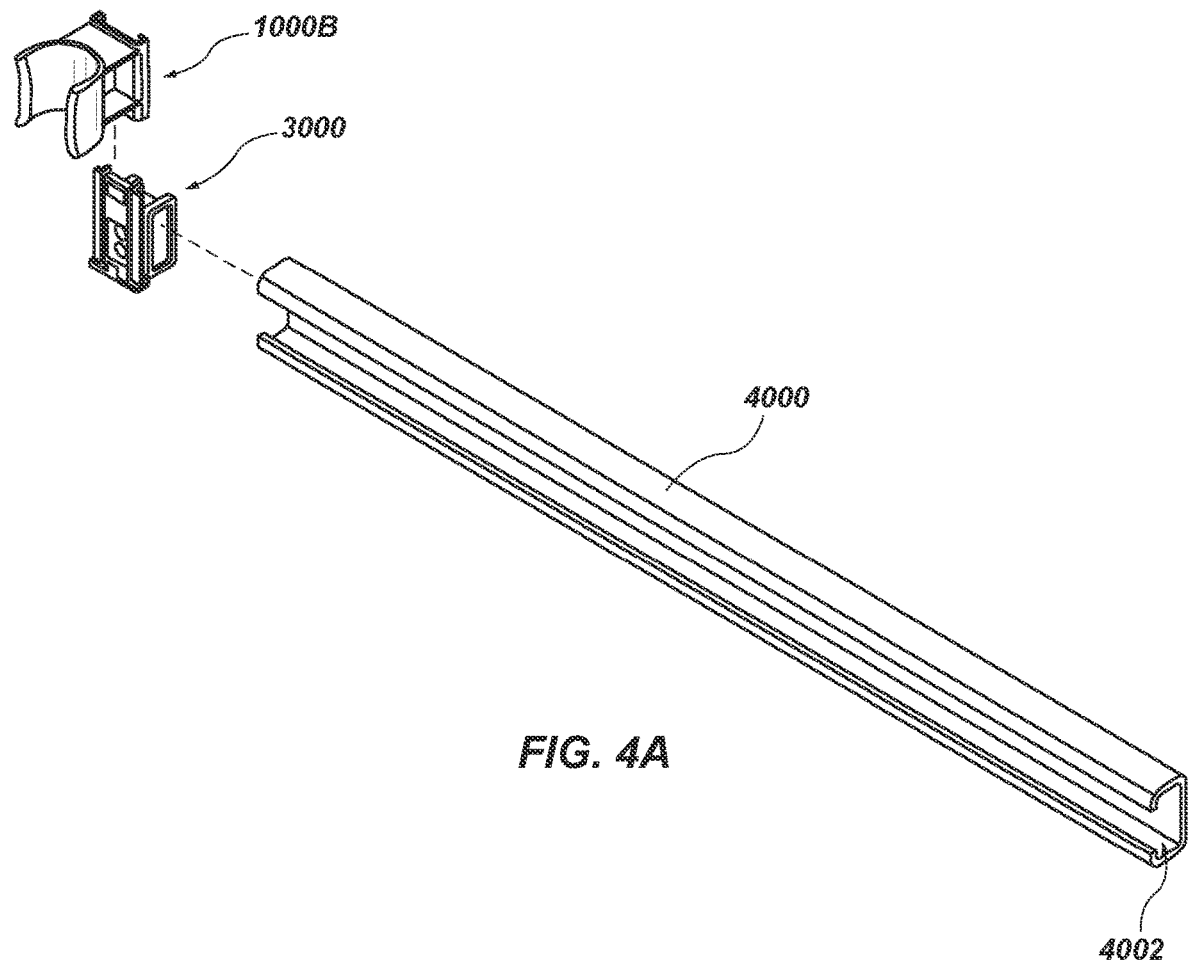
FIGS. 4A and 4B are front perspective view of an illustrative rail assembly for use with tool securing assemblies in accordance with the present disclosure with the storage base assembly of FIG. 3 and the tool securing assembly of FIG. 2A, in unassembled and assembled conformations.
Figure 4B:
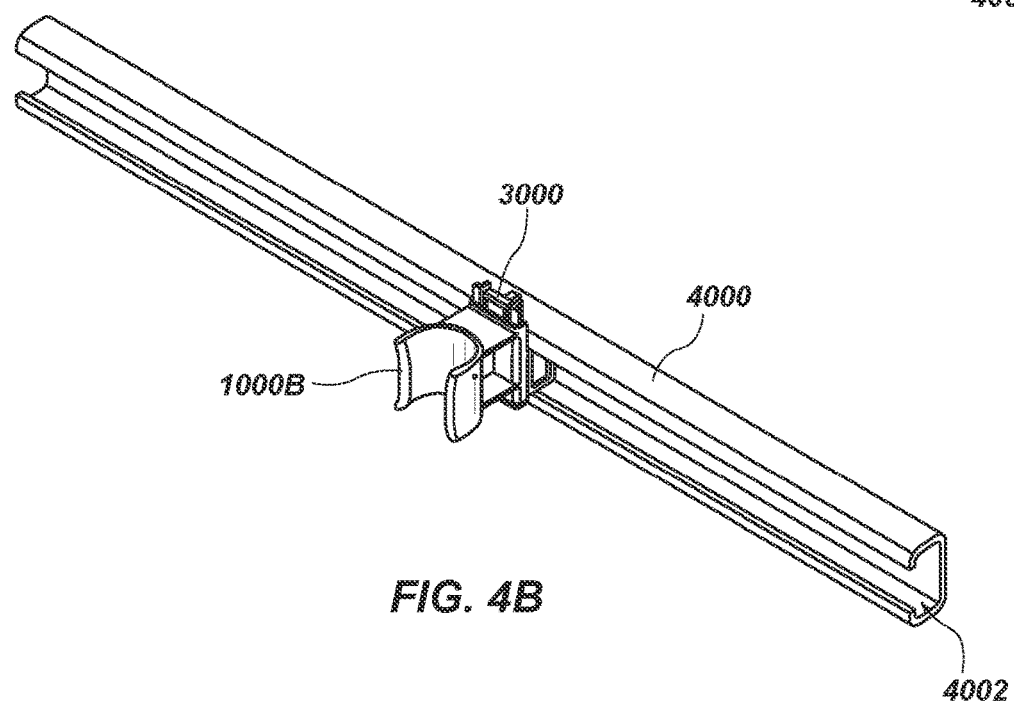

Turning to FIGS. 4A and 4B, some illustrative storage components for a system in accordance with the present disclosure are depicted. In addition to the tool retaining clip 1000B and storage base assembly 300, a storage beam 4000 is depicted. As depicted, the storage beam member 400 may be a beam that defines a generally C-shaped channel 4002 along its length.

As depicted in FIG. 4B, a tool retaining clip, such as clip 1000B may be secured to the storage base assembly 3000. Connection portion 1500A is slidably inserted over the front mounting portion. A lower end of the connection portion sidewall rests on floor 3102, with securing tab 3108 residing in front of lower portion front wall 1508 of the sidewall 1506. The flexible securing member 3114 may be flexed rearwards as the clip is inserted with counterpart slots and L shaped members residing in one another along the edges, and then secure the top member 1503 under its ledge as it flexes forwards. For removal, a user may depress the flexible securing member 3114 and slide the clip 1000B upwards.

For transport or storage, a tool retaining clip 1000A, 1000B or 1000C may be secured on a storage rack, or a beam 4000 to be retained thereon in a secured position. The clip may be secured to a storage base assembly 300 which is secure to a beam 4000. The storage base assembly 300 may be secured by may be slidably inserting connection body 3500 into the channel 4002 of the beam 4000 to be retained therein. Where present, the screw holes may be used to secure the base assembly in a desired position either permanently by passing though the beam into the structure to which it is mounted, or, by use of bolts that form a friction fit against the wall of the channel 4002. It will be appreciated that the screw holes 3001 may allow for the storage base 300 to be secured to a structure, such as a wall directly in the absence of the beam 4000. The depicted storage beam 4000 may be secured to a wall in a workshop or storage room, or in a trailer or vehicle storage area, as in a work truck.

Figure 5A:
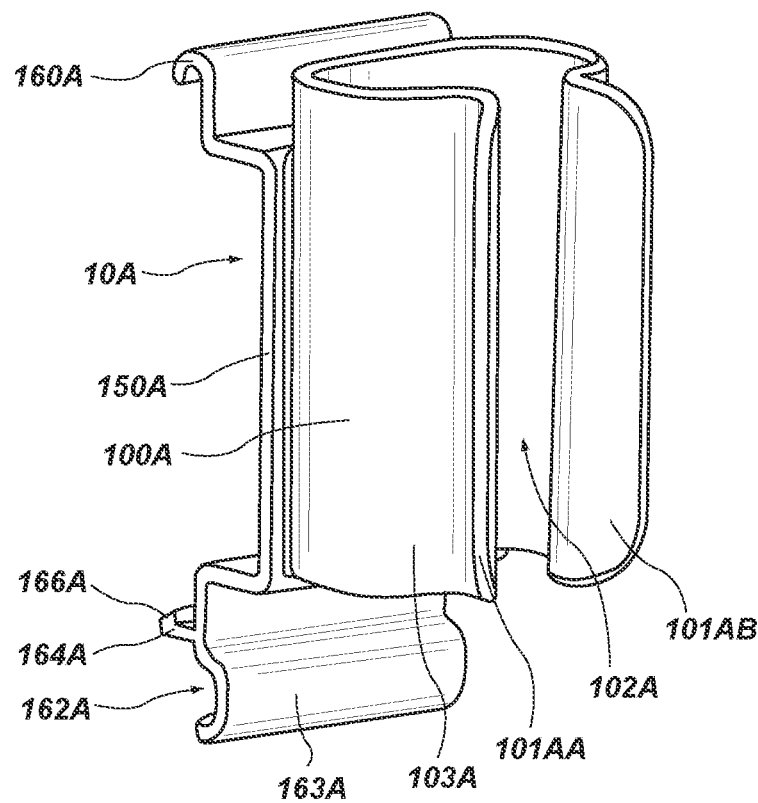
FIGS. 5A and 5B are perspective views, respectively, of first and second illustrative embodiments of a tool securing assembly for a tool retaining system in accordance with the present disclosure.
Figure 5B:
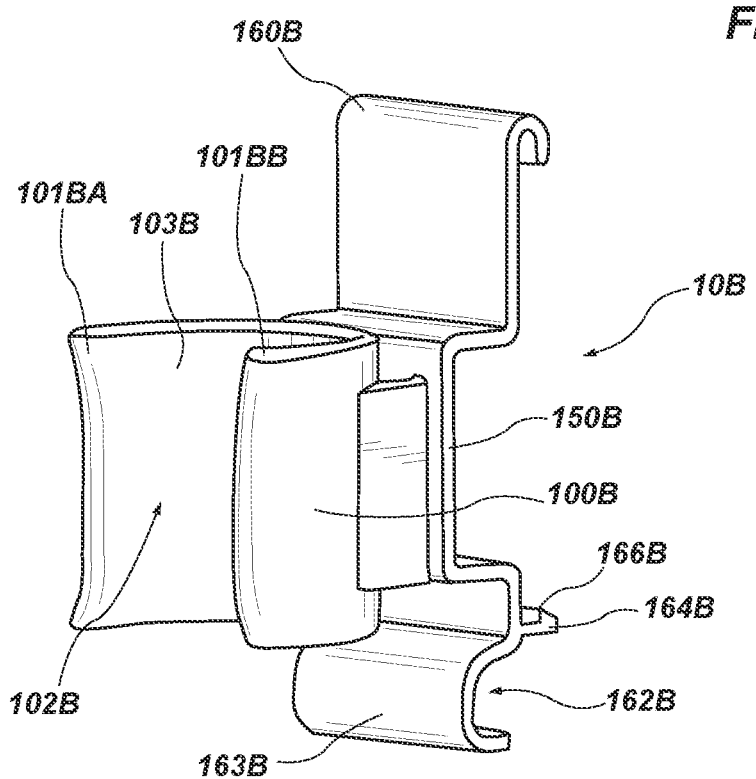

Referring to FIGS. 5A and 5B illustrative embodiments of another tool securing assembly 10A or 10B clips for use in a system in accordance with the teachings of the present disclosure are depicted. Tool securing assembly 10A or 10B features a tool retaining clip 100A or 100B.

Tool retaining clip 100A or 100B may have a tool insertion opening, generally indicated at 102A or 102B, which has a width in the unflexed position that is smaller than a diameter of the portion of a toil, such as a handle or stem, to be secured therein. The tool insertion opening 102A or 102B may be formed as a vertical slot that is defined by two opposite side members, 101AA and 101AB or 101BA and 101BB, and allows access thereto to a tool retaining space 104A or 104B. Tool retaining space 104A or 104B is defined by a sidewall 103A or 103B that partially surrounds the space. In the depicted embodiments, the sidewall 103A and 103B may define a generally columnar bore.

Tool retaining clip 100A or 100B may be formed from a resilient material that allows the opposite side members 101AA and 101AB (or 101BA and 101BB) to flex away from one another to enlarge the insertion opening 102A or 102B as a tool is pressed against the side members 101A and 101B for insertion or removal. Any suitable material may be used, including thermoplastic acrylic-polyvinyl chloride materials, such as KYDEX with is commercially available in sheets from Sekisui SPI, or suitable injection molded materials. In the depicted embodiment, tool retaining clip 100A or 100B is directly molded on the base 150. In other embodiments, it could be formed from a strip of KEDEX or similar material trimmed and formed to the desired shape, which may be attached to the base 150 using suitable fasteners or an adhesive.

When a tool is inserted, the tool insertion opening 102A or 102B flexes to provide positive physical feedback that the tool is secured in the retaining clip. Where the tool has a stem portion with a non-round cross-sectional shape, the retaining clip may require the tool to be rotated as it is inserted to provide additional physical feedback. In the depicted embodiments, tool clip 100A is configured retain the handle of a hammer therein and tool clip 100B is configured to retain the handle portion of a cordless drill.

Each tool retaining clip includes a connection portion 150A or 150B that includes a generally planar central portion 152A or 152B to which the retaining clip 100A or 100B is connected. Parallel upper and lower spacing members, 157 and 159, may extend outwards away from the generally planar central portion base 152A or 1502 at the upper end and lower ends thereof, respectively. An upper connection clip 160A or 160B may be disposed on the distal end of the upper spacing member and have a "hook" portion which opens downwards.

A securing portion 162 may be disposed on the distal end of the lower spacing member and as depicted, may include a downwards extending portion that includes a handle portion 163, that may be formed with a groove for the insertion and gripping with a user's fingers and a rearward extending securing tab 164 formed as planar body with a locking tab formed as a tapered ridge 166 with a generally vertical sidewall. The securing portion may be formed from a resilient material, allowing a user to grip the handle and pull downwards to flex the locking tab downwards.

Figure 6:
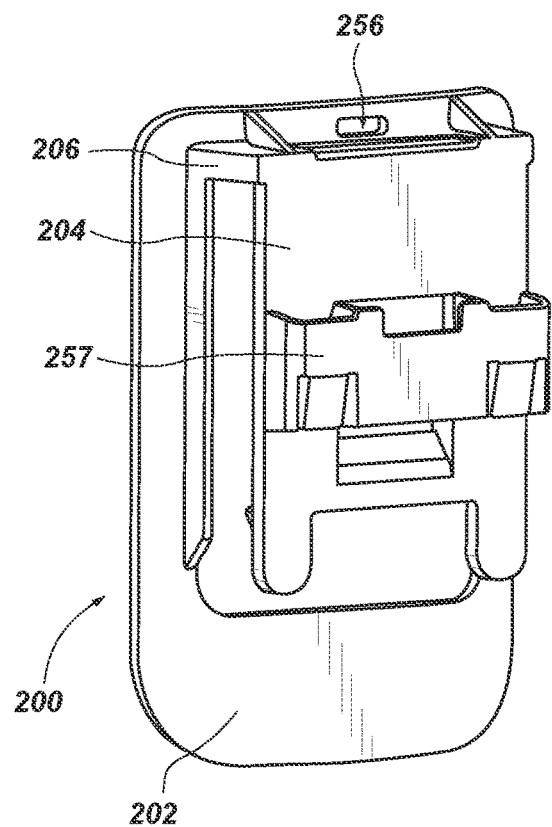
FIG. 6 is a perspective front view of a base assembly for a tool securing assembly in accordance with one aspect of the present disclosure depicted in isolation.

The base assembly 200, depicted in isolation in FIG. 6, provides for attachment to a clip assembly 100, including those depicted in FIGS. 5A and 5B, allowing the clip and for the tool securing assembly 10 to be secured in place for use. As depicted, a front mounting portion 204 may be generally formed as a planar member. Similarly, a rear securing portion 202 may generally be formed as a planar member.

Rear securing portion 202 and front mounting portion 204 may be joined together at a top end by a top member 206, under which they extend parallel to one another separated by a space defining a retaining recess 260. A connection recess 256 may be formed as a port 256 in the top member 206 that is configured to receive the upper connection clip 160 of a tool retaining clip.

Rear securing portion 202 extends past the lower end of front mounting portion 204 to a lower insertion end, that may have rounded corners. At a lower end of front mounting portion 204, a lower securing recess 258 may be formed as a recessed notch in the lower end defined by sidewall. In the depicted embodiment, a secondary connection structure 257 may be formed as an extension disposed on the front mounting portion. The secondary connection structure may define a central loop and/or one or more side loops. The central loop may be used to attach a clip on a measuring tape thereto and the one or more side loops may be configured to retain a writing instrument, such as a carpenter's pencil therein. One or more securing barbs 259 may be disposed on the rear surface of the front mounting portion as an angled tab.

Figure 7:
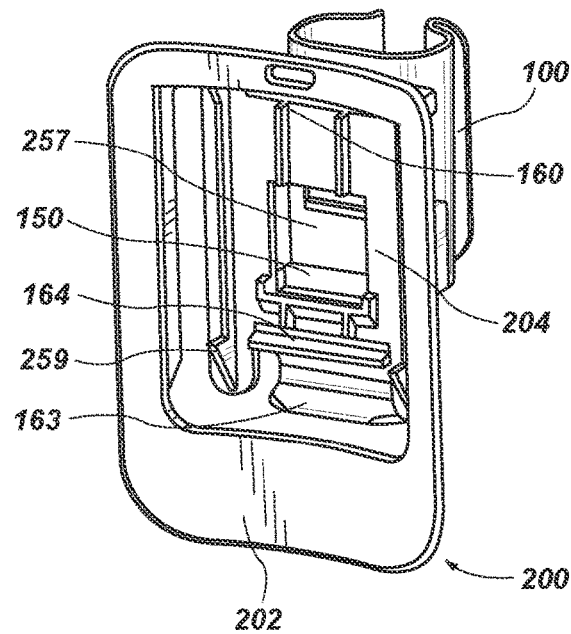
FIG. 7 is a rear perspective view of the tool securing assembly of FIG. 5A when connected to the base assembly of FIG. 6.

As depicted in FIG. 7, a tool retaining clip 100 may be secured to the base assembly 200. The upper connection clip is inserted in the port 256 and the securing tab 164 residing in the lower securing recess 258 with generally vertical sidewall behind the tapered ridge abutting a rear surface of the front mounting portion, securely maintaining the clip 100 in place. It will be appreciated that the tapered ridge facilitates securing by acting as guide when the connection portion flexes as the clip 100 is pressed into place. For removal, a user may pull down on the handle portion to flex the securing tab 164 away from the secured position.

The base assembly 200 may be secured on an item attached to the body, such as tool belt, to securely stow a tool retained in a tool clip the tool securing assembly for use when needed, but placed out of the way in an accessible position when not needed, for a user at a job site. For example, a base assembly 200, with or without a tool retaining clip 100 secured thereto, may be secured to a tool belt. The body of the tool belt may pass through the retaining recess 260, such that as the belt is worn by a user, the top member 256 abuts the upper edge of the tool belt. The belt may be inserted through the member from one side to the other and then secured to a user's body. Alternatively, and especially where the belt TB is already worn by a user, the front mounting portion 254 and rear securing portion 252 may be flexed away from one another to move lower recess member 258 away from the securing portion 252 to allow access to the retaining recess 260 with the insertion end inserted between the belt and the body of the user and the base lowered until the belt is secured in the retaining recess. The front mounting portion 254 and rear securing portion 252 are then allowed to relax and the lower recess member returns to the unflexed position to retain the assembly in position on the belt. It will be appreciated that the base assembly 200 may similarly be used to securely attach to a suitable pocket on a clothing item of a user.

Figure 8:
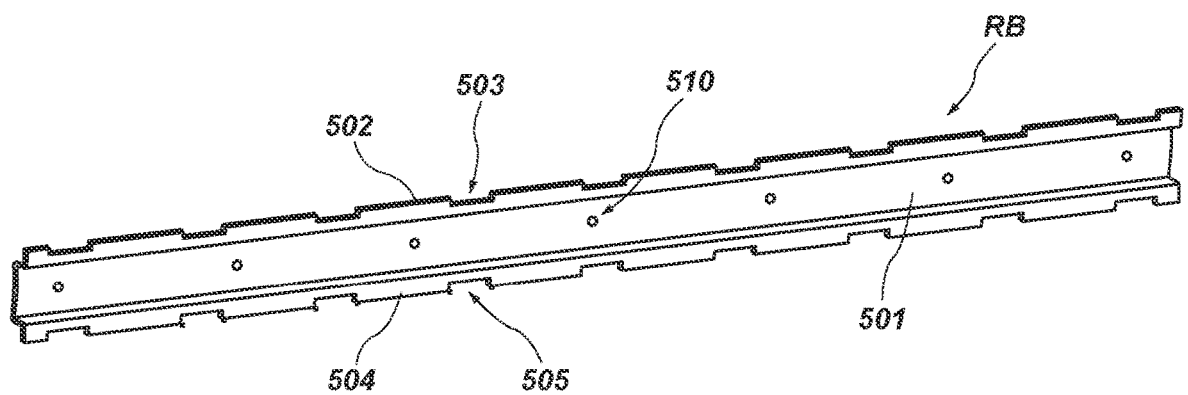
FIG. 8 is a front perspective view of an illustrative rail assembly for use with tool securing assemblies in accordance with the present disclosure.
Figure 9:
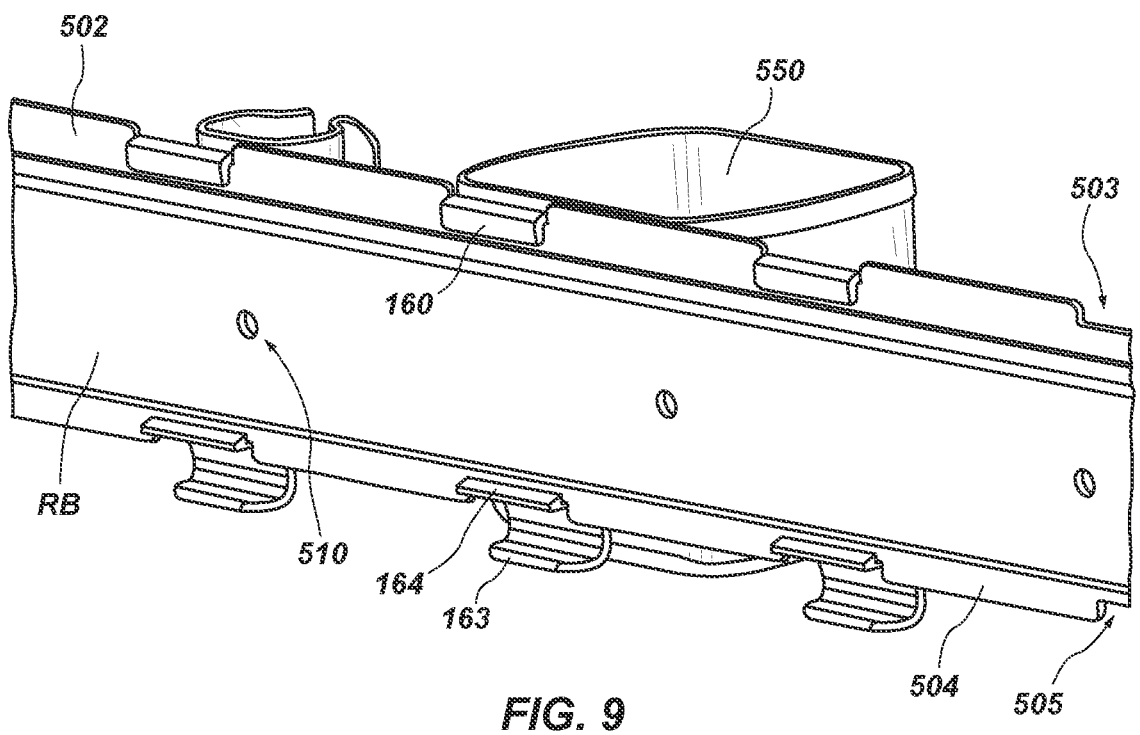
FIG. 9 is a rear perspective view of the rail assembly of FIG. 8 connected to tool assemblies of the present disclosure.

For transport or storage, a tool retaining clip 100 may be secured on a storage rack, or a beam RB on a storage rack to be retained thereon in a secured position. FIG. 8 depicts one such beam RB in isolation and FIG. 9 depicts the beak RB with several tool retaining clips 100 disposed thereon. The depicted storage rack RB may be secured to a wall in a workshop or storage room, or in a trailer or vehicle storage area, as in a work truck. A number of securing holes 510 are disposed through the beam, allowing it to be secured to a surface using suitable fasteners. The central portion of the beam 501 may be formed as a generally planar body, with an upper flange 502 and a lower flange 504 each spaced in front of the body and extending away therefrom in a parallel plane. Upper flange 502 and lower flange 504 have corresponding upper and lower connection recesses 503 and 505 formed therein as notches that are sized to correspond to the connection portions of the tool retaining clips 100. The beam RB may be formed as unitary member as by bending metal stock or molding of suitable materials.

For storage, a tool retaining clip 100 may be detachably connected to the beam RB. The upper connection clip 160 of the clip 100 is inserted in an upper recess 503 and secured over the flange 502 and the securing tab 164 is inserted through the lower recess 505 until the generally vertical sidewall resides behind the lower flange 504, securely maintaining the clip 100 in place. It will be appreciated that the tapered ridge facilitates securing by acting as guide when the connection portion flexes as the clip 100 is pressed into place. For removal, a user may pull down on the handle portion to flex the securing tab 164 away from the secured position.

Figure 10:
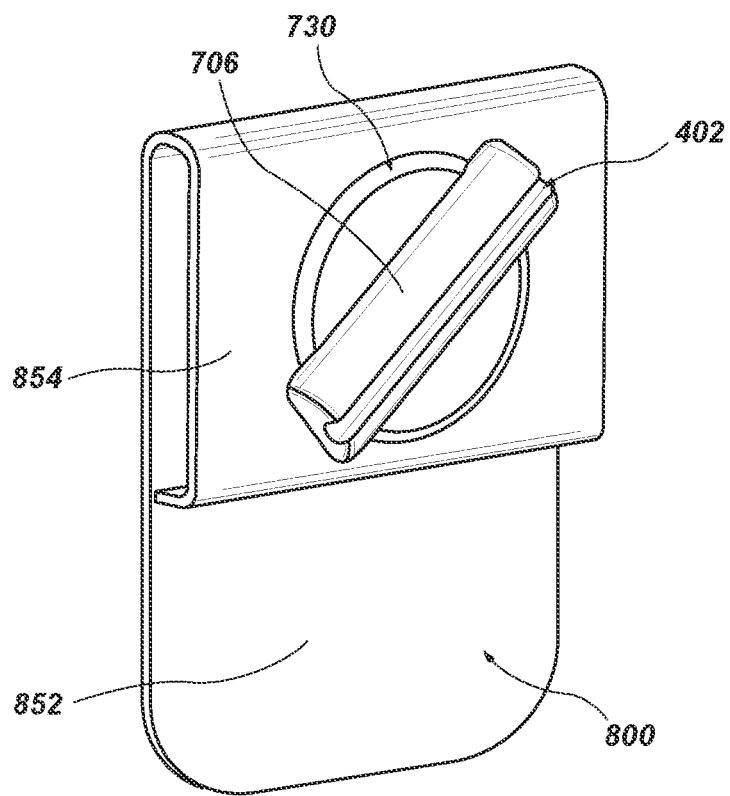
FIG. 10 depicts another illustrative embodiment of a tool securing assembly for a tool retaining system in accordance with the present disclosure.

It will be appreciated that alternative tool retaining clip assemblies may be used with the system of the present invention. For example, clip 550 depicted in FIG. 9, in place of the tool retaining clip 100 has a bucket 600 attached to base 150 for use as a screw or nail holder. FIG. 10 depicts another embodiment of a tool retaining assembly 700, in which the tool retaining clip 706 is rotatably mounted to directly to a base assembly 800 to allow a tool to utilized while secured, as for use with a fishing rod or the like. The clip 706 is mounted to a rotational structure 730, such as a wheel disposed on an indexed axle assembly on the front mounting portion 754. It will be appreciated that other clips attached directly to base assemblies may be used.

In the foregoing Detailed Description, various features of the disclosure are grouped together in a single implementation for streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed implementation. Thus, the following claims are hereby incorporated into this Detailed Description by this reference, with each claim standing on its own as a separate implementation of the disclosure.

It will be further appreciated that the embodiments depicted and discussed in this disclosure are exemplary rather than limiting. Thus, it is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Accordingly, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A system for securing tools for use, storage, and transport, comprising:
    a tool securing assembly comprising
        at least a first tool retaining clip, the at least first tool retaining clip comprising a front tool securing feature and a rear securing portion with a lower connection feature and an upper connection feature; and
    a wearable usage base assembly comprising
        a top member,
        a front mounting portion connected to the top member and extending downwards therefrom, the front mounting portion comprising a counterpart lower base connection feature and a counterpart upper base connection feature, such that when the rear securing portion of the at least first tool retaining clip is placed in position with the front mounting portion of the usage base assembly, the lower connection feature and counterpart lower base connection feature and the upper connection feature and counterpart upper base connection feature interact to releasably secure the at least first tool retaining clip to the usage base assembly by flexion of a securing member to reside in a counterpart securing position to retain the at least first tool retaining clip to the usage base assembly, and
        a rear securing portion joined to the top member and extending from the top member parallel to the front mounting portion and at least a portion of the rear securing portion separated from the front mounting portion by a retaining recess.

2. The system of claim 1, wherein the front securing feature of the at least first tool retaining clip comprises two opposite curved members that extend towards one another from a common base to opposite distal ends that parallel one another to define a curved tool retaining space with a tool insertion opening defined between the distal ends which is in communication with the tool retaining space.

3. The system of claim 2, wherein the front securing feature is at least partially formed from a resilient material and the tool insertion opening is sized and configured to correspond to a portion of a first tool, such that the tool insertion opening has an unactuated width which is smaller than a diameter of the portion of the first tool, such that when the portion of the first tool is inserted though the tool insertion opening, the tool insertion opening flexes to allow the portion of the first tool to pass therethrough, then returns to the unactuated position.

4. The system of claim 3, wherein the tool insertion opening is sized to require the first tool to be rotated as it is inserted though the tool insertion opening.

5. The system of claim 1, further comprising a second tool retaining clip, the second tool retaining clip comprising a front tool securing feature and a rear securing portion with a lower connection feature and an upper connection feature, such that when the rear securing portion of the second tool retaining clip is placed in position with the front mounting portion of the usage base assembly, the lower connection feature and counterpart lower base connection feature and the upper connection feature and counterpart upper base connection feature interact to secure the second tool retaining clip to the usage base assembly wherein the second tool retaining clip may be releasably secured to the wearable usage base assembly when the at least first tool retaining clip is not secured to the wearable usage base assembly.

6. The system of claim 1, wherein the top member extending between the rear securing portion and the front mounting portion defines an upper surface of the wearable usage base assembly.

7. The system of claim 1, wherein the front mounting portion of the wearable usage base assembly further comprises a seat, and the rear securing portion of the at least one tool retaining clip is received in the seat when the wearable usage base assembly and the at least first tool retaining clip are secured together.

8. The system of claim 7, wherein the wearable usage base assembly further comprises at least one loop member disposed on the front mounting portion to a side of the seat, the at least one loop member defining a space to retain a writing implement.

9. A modular tool retaining clip system for securing tools for use, storage, and transport, comprising:
   a wearable usage base assembly comprising
      a front mounting portion comprising a planar front member, and a seat formed as a recess for receiving a tool retaining clip assembly,
      a rear securing portion extending parallel to the front mounting portion and at least a portion of the rear securing portion separated from the front mounting portion by a retaining recess sized and configured for retaining a tool belt;
      a top member joining the front mounting portion to the rear securing portion, such that when the wearable usage base assembly is placed on a tool belt, the tool belt resides in the retaining recess and abuts the top member; and
   at least a first tool retaining clip, the at least first tool retaining clip comprising a front tool securing feature and a rear securing portion which is formed as member corresponding to the seat to be received thereon.

10. The system of claim 9, wherein the rear securing portion of the at least one tool retaining clip comprises a generally planar member and the seat comprises a slot defined by a rear wall and a front wall, such that when the rear securing portion is slidably inserted into the seat, at least a portion of the rear securing portion is secured between the rear wall and the front wall.

11. The system of claim 10, wherein the rear securing portion of the at least one tool retaining clip comprises an upper connection feature and the front mounting portion of the usage base assembly includes counterpart upper base connection feature, such that when the rear securing portion is slidably inserted into the seat, the upper connection feature and counterpart upper base connection feature interact to secure the at least first tool retaining clip to the usage base assembly.

12. The system of claim 9, wherein the front securing feature of the at least first tool retaining clip comprises two opposite curved members that extend towards one another from a common base to opposite distal ends that parallel one another to define a curved tool retaining space with a tool insertion opening defined between the distal ends which is in communication with the tool retaining space.

13. The system of claim 12, wherein the front securing feature is at least partially formed from a resilient material and the tool insertion opening is sized and configured to correspond to a portion of a first tool, such that the tool insertion opening has an unactuated width which is smaller than a diameter of the portion of the first tool, such that when the portion of the first tool is inserted though the tool insertion opening, the tool insertion opening flexes to allow the portion of the first tool to pass therethrough, then returns to the unactuated position.

14. The system of claim 9, further comprising a second tool retaining clip, the second first tool retaining clip comprising a front tool securing feature and a rear securing portion which is formed as a member corresponding to the seat to be received thereon.

15. The system of claim 14, wherein the front tool securing feature of the second first tool retaining clip comprises a loop member defining a space for receiving a retaining clip on a tool.

16. A modular tool retaining clip system for securing tools for use, storage, and transport, comprising:
   a usage base assembly comprising
      a front mounting portion comprising a planar front member, and a seat formed as a recess for receiving a tool retaining clip assembly,
      a rear securing portion extending parallel to the front mounting portion and at least a portion of the rear securing portion separated from the front mounting portion by a retaining recess;
      at least one loop member disposed on the planar front member to a side of the seat, the at least one loop member defining a space to retain a writing implement; and
   at least a first tool retaining clip, the at least first tool retaining clip comprising a front tool securing feature and a rear securing portion which is formed as member corresponding to the seat to be received thereon.

\* \* \* \* \*